United States Patent
Matsumoto

(10) Patent No.: US 9,073,778 B2
(45) Date of Patent: *Jul. 7, 2015

(54) GLASS WELDING METHOD

(75) Inventor: Satoshi Matsumoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/509,112

(22) PCT Filed: Sep. 17, 2010

(86) PCT No.: PCT/JP2010/066135
§ 371 (c)(1),
(2), (4) Date: Jun. 1, 2012

(87) PCT Pub. No.: WO2011/058819
PCT Pub. Date: May 19, 2011

(65) Prior Publication Data
US 2012/0234048 A1    Sep. 20, 2012

(30) Foreign Application Priority Data
Nov. 12, 2009 (JP) ................. P2009-258989

(51) Int. Cl.
*C03B 23/24* (2006.01)
*C03B 33/09* (2006.01)
(Continued)

(52) U.S. Cl.
CPC ........... *C03B 33/076* (2013.01); *B23K 26/0063* (2013.01); *C03B 23/245* (2013.01); *C03B 33/091* (2013.01); *C03C 27/06* (2013.01)

(58) Field of Classification Search
CPC ........ C03C 27/00; C03C 17/00; C03B 21/00; C03B 23/00; C03B 29/00

USPC ................................... 65/43; 156/99
See application file for complete search history.

(56) References Cited

U.S. PATENT DOCUMENTS 3,453,097 A * 7/1969 Hafner ........................... 65/112
3,663,793 A * 5/1972 Petro et al. .............. 219/121.69
(Continued)

FOREIGN PATENT DOCUMENTS

CN    1329395    1/2002
CN    1738777    2/2006
(Continued)

OTHER PUBLICATIONS

U.S. Office Action dated Jul. 2, 2014 that issued in U.S. Appl. No. 13/511,754 including Double Patenting Rejections on pp. 5-8.
(Continued)

*Primary Examiner* — Jodi C Franklin
(74) *Attorney, Agent, or Firm* — Drinker Biddle & Reath LLP

(57) ABSTRACT

Glass layers 3 are molten by irradiation with laser light L, so as to generate a temperature difference in a part along regions to be fused R in each of glass substrates 40, 50 so that main faces 40a, 50a on the glass layer 3 side have a temperature higher than that on main faces 40b, 50b on the opposite side of the glass layers 3. Thereafter, the molten glass layers 3 solidify, and cooling generates a stress in the glass substrates 40, 50. Here, since initial fractures 8 are formed in the glass substrate 50 so as to overlap the glass layers 3, fractures grow in the thickness direction of the glass substrates 40, 50 through the glass layers 3 from the initial fractures 8 acting as a start point.

5 Claims, 12 Drawing Sheets

(51) Int. Cl.
  *C03B 33/07* (2006.01)
  *B23K 26/00* (2014.01)
  *C03C 27/06* (2006.01)

(56) References Cited

U.S. PATENT DOCUMENTS

| | | | |
|---|---|---|---|
| 4,343,833 A | 8/1982 | Sawae et al. | |
| 5,489,321 A | 2/1996 | Tracy et al. | |
| 6,565,400 B1 | 5/2003 | Lee et al. | |
| 7,371,143 B2* | 5/2008 | Becken et al. | 445/25 |
| 7,641,976 B2* | 1/2010 | Lamberson et al. | 428/428 |
| 7,820,941 B2* | 10/2010 | Brown et al. | 219/121.69 |
| 7,834,550 B2* | 11/2010 | Lee et al. | 313/512 |
| 7,932,670 B2* | 4/2011 | Yoo et al. | 313/505 |
| 8,063,561 B2* | 11/2011 | Choi et al. | 313/512 |
| 8,440,479 B2* | 5/2013 | Nguyen et al. | 438/29 |
| 8,490,434 B2* | 7/2013 | Watanabe et al. | 65/155 |
| 8,516,852 B2* | 8/2013 | Matsumoto et al. | 65/36 |
| 2004/0069017 A1* | 4/2004 | Li et al. | 65/43 |
| 2004/0207314 A1 | 10/2004 | Aitken et al. | |
| 2005/0103755 A1 | 5/2005 | Baker et al. | |
| 2006/0082298 A1 | 4/2006 | Becken et al. | |
| 2006/0084348 A1 | 4/2006 | Becken et al. | |
| 2007/0007894 A1* | 1/2007 | Aitken et al. | 313/512 |
| 2007/0053088 A1* | 3/2007 | Kranz et al. | 359/883 |
| 2007/0128967 A1* | 6/2007 | Becken et al. | 445/25 |
| 2007/0170845 A1* | 7/2007 | Choi et al. | 313/504 |
| 2007/0173167 A1* | 7/2007 | Choi | 445/25 |
| 2008/0106194 A1 | 5/2008 | Logunov et al. | |
| 2008/0124558 A1* | 5/2008 | Boek et al. | 428/427 |
| 2008/0135175 A1* | 6/2008 | Higuchi | 156/344 |
| 2008/0182062 A1* | 7/2008 | Becken et al. | 428/68 |
| 2009/0071588 A1 | 3/2009 | Kimura et al. | |
| 2009/0080055 A1 | 3/2009 | Baur et al. | |
| 2009/0086325 A1 | 4/2009 | Liu et al. | |
| 2009/0110882 A1* | 4/2009 | Higuchi | 428/138 |
| 2009/0142984 A1 | 6/2009 | Logunov et al. | |
| 2009/0297861 A1* | 12/2009 | Banks et al. | 428/428 |
| 2009/0297862 A1* | 12/2009 | Boek et al. | 428/428 |
| 2009/0308105 A1 | 12/2009 | Pastel et al. | |
| 2010/0006228 A1* | 1/2010 | Abe et al. | 156/356 |
| 2010/0095705 A1* | 4/2010 | Burkhalter et al. | 65/61 |
| 2010/0116119 A1* | 5/2010 | Bayne | 83/880 |
| 2010/0129666 A1 | 5/2010 | Logunov et al. | |
| 2010/0154476 A1* | 6/2010 | Becken et al. | 65/36 |
| 2010/0267307 A1 | 10/2010 | Park et al. | |
| 2010/0304513 A1 | 12/2010 | Nguyen et al. | |
| 2011/0001424 A1 | 1/2011 | Logunov et al. | |
| 2011/0061789 A1* | 3/2011 | Matsumoto | 156/99 |
| 2011/0067448 A1* | 3/2011 | Matsumoto et al. | 65/36 |
| 2011/0072855 A1* | 3/2011 | Matsumoto et al. | 65/36 |
| 2011/0088430 A1* | 4/2011 | Matsumoto | 65/43 |
| 2011/0088431 A1* | 4/2011 | Matsumoto | 65/43 |
| 2011/0135857 A1* | 6/2011 | Logunov et al. | 428/34.6 |
| 2011/0169108 A1* | 7/2011 | Gardner et al. | 257/417 |
| 2011/0223360 A1* | 9/2011 | Shibuya et al. | 428/34 |
| 2011/0223371 A1* | 9/2011 | Kawanami | 428/76 |
| 2011/0256407 A1 | 10/2011 | Boek et al. | |
| 2011/0265518 A1 | 11/2011 | Matsumoto et al. | |
| 2012/0111059 A1* | 5/2012 | Watanabe et al. | 65/43 |
| 2012/0147538 A1* | 6/2012 | Kawanami et al. | 361/679.01 |
| 2012/0151965 A1* | 6/2012 | Matsumoto et al. | 65/43 |
| 2012/0156406 A1* | 6/2012 | Banks et al. | 428/34.4 |
| 2012/0222450 A1* | 9/2012 | Lamberson et al. | 65/43 |
| 2012/0234048 A1* | 9/2012 | Matsumoto | 65/56 |
| 2012/0240628 A1* | 9/2012 | Matsumoto | 65/43 |
| 2012/0240629 A1* | 9/2012 | Matsumoto | 65/43 |
| 2012/0240630 A1* | 9/2012 | Matsumoto | 65/43 |
| 2012/0240631 A1* | 9/2012 | Matsumoto | 65/43 |
| 2012/0240632 A1* | 9/2012 | Matsumoto | 65/43 |
| 2012/0240633 A1* | 9/2012 | Matsumoto | 65/43 |
| 2012/0247153 A1* | 10/2012 | Matsumoto | 65/43 |
| 2012/0260694 A1* | 10/2012 | Matsumoto | 65/43 |
| 2012/0285200 A1* | 11/2012 | Tanaka | 65/43 |
| 2012/0287026 A1 | 11/2012 | Masuda | |
| 2012/0318023 A1* | 12/2012 | Shimomura | 65/43 |
| 2012/0320444 A1 | 12/2012 | Baur et al. | |
| 2013/0011598 A1* | 1/2013 | Kawanami et al. | 428/76 |
| 2013/0104980 A1* | 5/2013 | Sridharan et al. | 136/259 |
| 2013/0111953 A1* | 5/2013 | Maloney et al. | 65/43 |
| 2013/0134396 A1* | 5/2013 | Shimomura et al. | 257/40 |
| 2013/0174608 A1* | 7/2013 | Takeuchi et al. | 65/40 |
| 2013/0237115 A1* | 9/2013 | Choi et al. | 445/25 |
| 2013/0280981 A1 | 10/2013 | Lee | |
| 2013/0314760 A1 | 11/2013 | Baur et al. | |

FOREIGN PATENT DOCUMENTS

| | | | | |
|---|---|---|---|---|
| CN | 1798708 | 7/2006 | | |
| CN | 1798710 | 7/2006 | | |
| CN | 1836177 | 9/2006 | | |
| CN | 101005915 | 7/2007 | | |
| CN | 101095247 | 12/2007 | | |
| CN | 101103429 | 1/2008 | | |
| CN | 101139165 | 3/2008 | | |
| CN | 100409392 C | 8/2008 | | |
| CN | 101312234 | 11/2008 | | |
| CN | 101386477 | 3/2009 | | |
| CN | 101434453 | 5/2009 | | |
| CN | 101501808 | 8/2009 | | |
| CN | 102056858 | 5/2011 | | |
| JP | 2-120259 | 5/1990 | | |
| JP | 5-166462 | 7/1993 | | |
| JP | 2002-015108 | 1/2002 | | |
| JP | 2002-224871 | 8/2002 | | |
| JP | 2002-287107 | 10/2002 | | |
| JP | 2002-366050 | 12/2002 | | |
| JP | 2002-367514 | 12/2002 | | |
| JP | 2002366050 A * | 12/2002 | | G09F 9/00 |
| JP | 2004-182567 | 7/2004 | | |
| JP | 2005-007665 | 1/2005 | | |
| JP | 2006-524419 | 7/2005 | | |
| JP | 2005-213125 | 8/2005 | | |
| JP | 2006-151774 | 6/2006 | | |
| JP | 2007-90405 | 4/2007 | | |
| JP | 2007-264135 | 10/2007 | | |
| JP | 2008-115057 | 5/2008 | | |
| JP | 2008-115067 | 5/2008 | | |
| JP | 2008115057 A * | 5/2008 | | |
| JP | 2008-127223 | 6/2008 | | |
| JP | 2008-527655 | 7/2008 | | |
| JP | 2009-123421 | 6/2009 | | |
| JP | 2009-196862 | 9/2009 | | |
| KR | 10-0350323 | 3/2002 | | |
| KR | 10-2007-0003681 | 5/2007 | | |
| TW | I495409 | 7/2002 | | |
| TW | 200516064 | 5/2005 | | |
| TW | I255934 | 6/2006 | | |
| TW | 200733787 | 9/2007 | | |
| TW | 200737370 | 10/2007 | | |
| TW | 200822789 | 5/2008 | | |
| TW | 200911438 | 3/2009 | | |
| TW | 200944908 | 11/2009 | | |
| WO | WO 2007067533 A2 * | 6/2007 | | |
| WO | WO 2009/131144 | 10/2009 | | |
| WO | 2009/150975 | 12/2009 | | |
| WO | 2009/150976 | 12/2009 | | |
| WO | 2009/157281 | 12/2009 | | |
| WO | 2009/157282 | 12/2009 | | |

OTHER PUBLICATIONS

U.S. Office Action dated Jun. 28, 2012 that issued in U.S. Appl. No. 12/994,320 including Double Patenting Rejections on pp. 7-9.
U.S. Office Action dated Jul. 9, 2012 that issued in U.S. Appl. No. 12/994,321 including Double Patenting Rejections on pp. 7-9.
Cheung, Kerry, "Die-Level Glass Frit Vacuum Packaging for a Micro-Fuel Processor System," Massachusetts Institute of Technology, Jun. 2005, pp. 17-19.
U.S. Office Action dated Apr. 25, 2013 that issued in U.S. Appl. No. 12/994,539 including Double Patenting rejections on pp. 5-8.
JP 20022366050 (Human Translation), retrieved from USPTO Translation Services and attached to the above-listed U.S. Office Action dated Apr. 25, 2013 in U.S. Appl. No. 12/994,539.

(56) References Cited

OTHER PUBLICATIONS

JP 2008115057 (Human Translation), retrieved from USPTO Translation Services and attached to the above-listed U.S. Office Action dated Apr. 25, 2013 in U.S. Appl. No. 12/994,539.
JP 20022366050 (Machine Translation), as attached to Office Action dated Jun. 1, 2012 in U.S. Appl. No. 12/994,354.
JP 2008115057 (Machine Translation), as attached to Office Action dated Jun. 1, 2012 in U.S. Appl. No. 12/994,354.
U.S. Office Action dated May 9, 2013 that issued in U.S. Appl. No. 12/994,399 including Double Patenting Rejections on pp. 6-10.
U.S. Office Action dated Apr. 25, 2014 that issued in U.S. Appl. No. 13/511,721 including Double Patenting Rejections on pp. 2-3.
U.S. Office Action dated Jan. 28, 2014 that issued in U.S. Appl. No. 13/511,688 including Double Patenting Rejections on pp. 4-8.
U.S. Office Action dated Jan. 16, 2014 that issued in U.S. Appl. No. 13/511,735 including Double Patenting Rejections on pp. 4-8.
U.S. Office Action dated Jun. 3, 2014 that issued in U.S. Appl. No. 13/511,683 including Double Patenting Rejections on pp. 5-11.
U.S. Office Action dated Jul. 1, 2014 that issued in U.S. Appl. No. 13/511,738 including Double Patenting Rejections on pp. 4-5.
U.S. Office Action dated Jul. 31, 2014 that issued in U.S. Appl. No. 12/994,354 including Double Patenting Rejections on pp. 7-10.
U.S. Office Action dated Jul. 1, 2014 that issued in U.S. Appl. No. 13/511,747 including Double Patenting Rejections on pp. 4-5.
U.S. Office Action dated Feb. 24, 2015 that issued in U.S. Appl. No. 13/345,199 including Double Patenting Rejections on pp. 4-14.

* cited by examiner

Fig.8
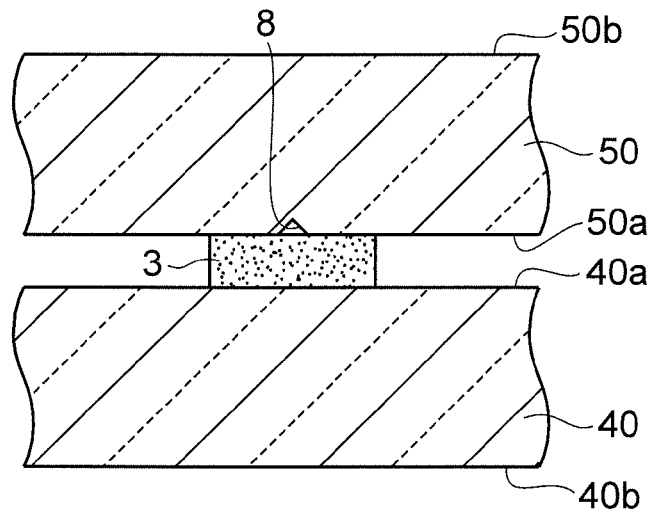
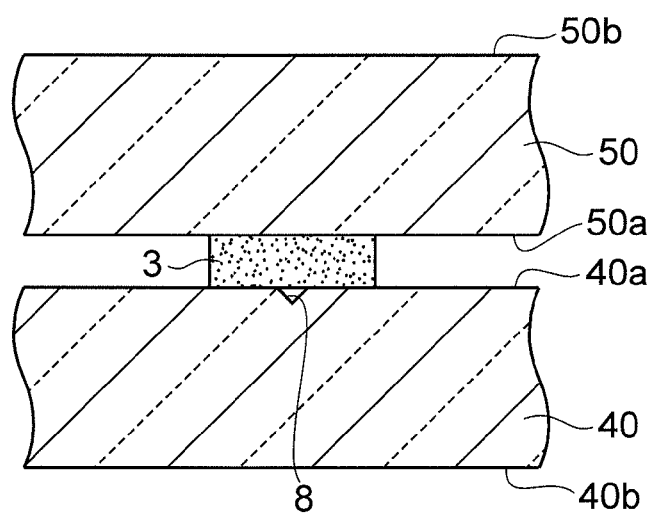
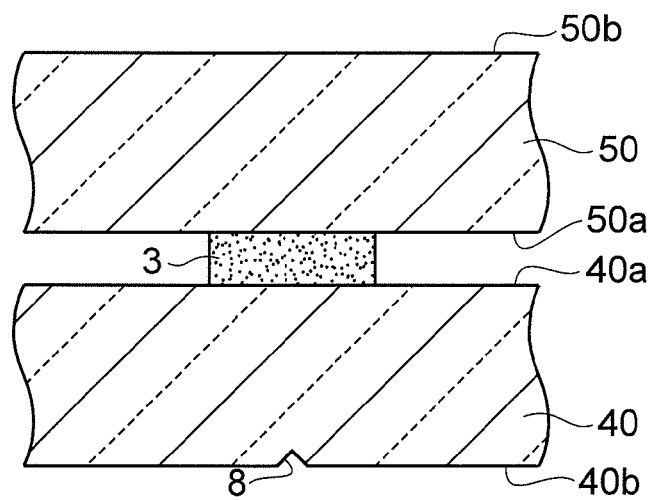

Fig.9
(a)
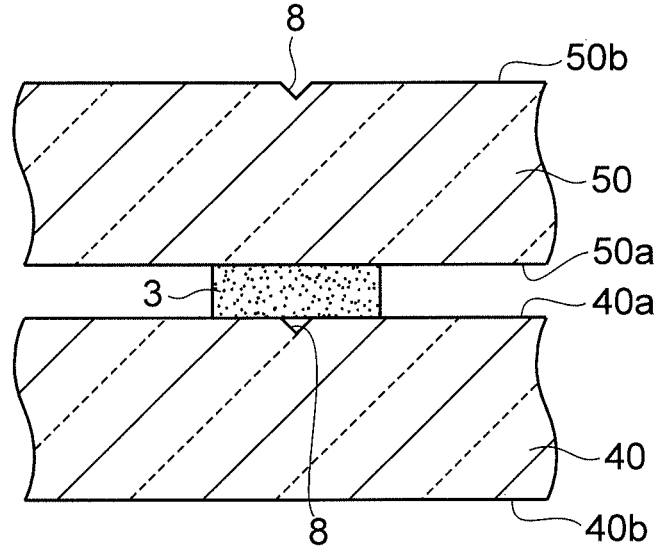
(b)
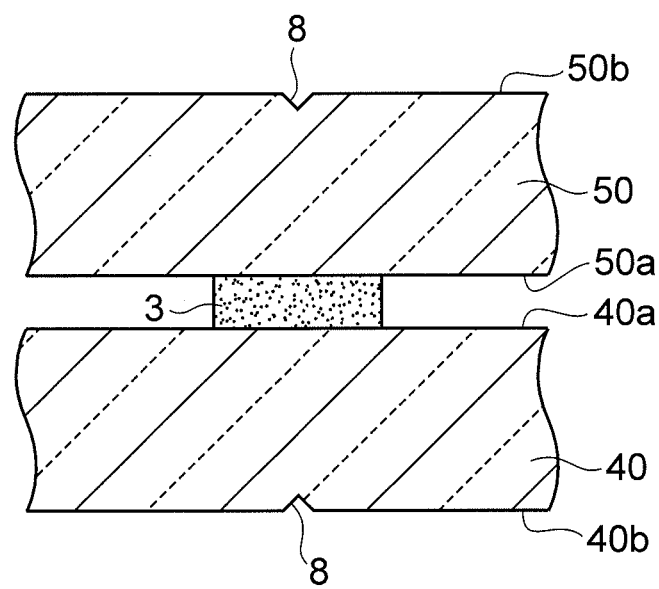

Fig.10
(a)
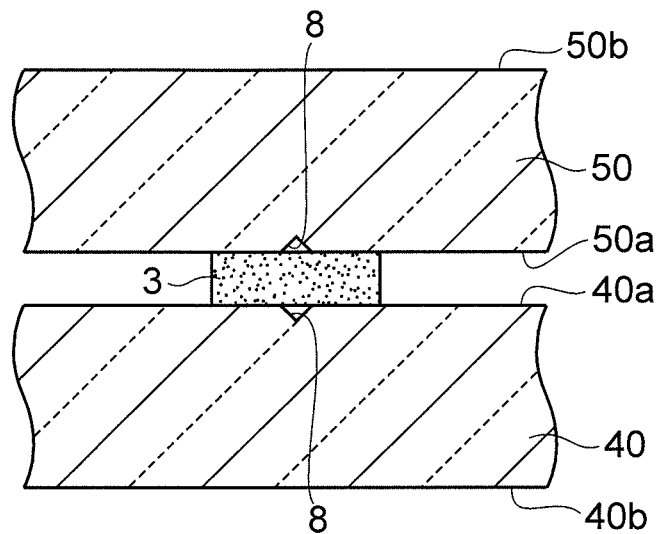
(b)
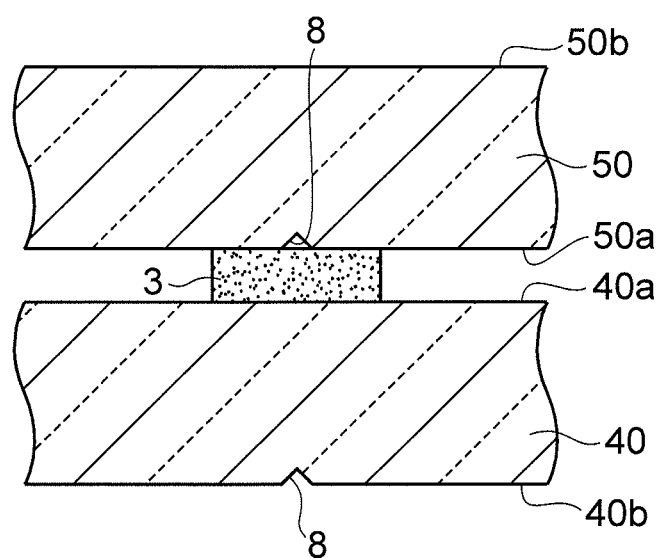

GLASS WELDING METHOD

TECHNICAL FIELD

The present invention relates to a glass fusing method which manufactures a glass fusing structure by fusing glass substrates to each other.

BACKGROUND ART

Various techniques concerning fusing and cutting of glass substrates by utilizing laser light have conventionally been proposed (see, for example, Patent Literatures 1 to 4). Patent Literature 1 discloses a technique which irradiates stacked glass substrates with laser light along a cutline, so as to fusion-cut the glass substrates by laser ablation, while using the resulting heat to fuse the glass substrates to each other.

CITATION LIST

Patent Literature

Patent Literature 1: Japanese Patent Application Laid-Open No. 2007-90405
Patent Literature 2: Japanese Translated International Application Laid-Open No. 2006-524419
Patent Literature 3: Japanese Patent Application Laid-Open No. 2007-264135
Patent Literature 4: Japanese Patent Application Laid-Open No. 2002-287107

SUMMARY OF INVENTION

Technical Problem

Since the glass substrates are fusion-cut by laser ablation in the technique disclosed in Patent Literature 1, however, organic matters and the like may remain as contaminants in the part where the glass substrates are fused to each other, thereby deteriorating the reliability of the glass fusing structure.

In view of such circumstances, it is an objet of the present invention to provide a glass fusing method which can manufacture a highly reliable glass fusing structure.

Solution to Problem

For achieving the above-mentioned object, the glass fusing method in accordance with the present invention is a glass fusing method for manufacturing a glass fusing structure by fusing first and second glass substrates to each other, the method comprising the steps of arranging a glass layer containing a laser-light-absorbing material between the first and second glass substrates with a predetermined width along an extending region to be fused; forming an initial fracture in at least the second glass substrate in the first and second glass substrates such that the initial fracture overlaps the glass layer when seen in a thickness direction of the first and second glass substrates; and irradiating the glass layer with laser light such that at least a part of the initial fracture is included in the laser light while relatively moving an irradiation region of the laser light along the region to be fused, so as to subject the glass layer and the first and second glass substrates to a heating stage and a cooling stage, thereby fusing and cleaving the first and second glass substrates along the region to be fused; wherein in the heating stage the glass layer is molten and a temperature difference is generated in a part along the region to be fused in each of the first and second glass substrates so that a main face on the glass layer side has a temperature higher than that on a main face on the opposite side of the glass layer in each of the first and second glass substrates; and wherein in the cooling stage the molten glass layer is solidified and by a stress occurring during cooling a fracture is grown in a thickness direction of the first and second glass substrates through the glass layer from the initial fracture acting as a start point.

In this glass fusing method, the glass layer is molten by irradiation with the laser light in the heating stage, so as to generate a temperature difference in a part along the region to be fused in each of the first and second glass substrates such that the main face on the glass layer side has a temperature higher than that on the main face on the opposite side. In the cooling stage, the molten glass layer solidifies, and the cooling generates a stress in the first and second glass substrates. Here, since the initial fracture is formed in at least the second glass substrate so as to overlap the glass layer when seen in the thickness direction of the first and second glass substrates, a fracture grows in the thickness direction of the first and second glass substrates through the glass layer from the initial fracture acting as a start point. As a consequence, contaminants remain less than in fusion-cutting by laser ablation, for example, so that the first and second glass substrates can be fused together and cleaved along the region to be fused. Hence, this glass fusing method can manufacture a highly reliable glass fusing structure. Either the step of arranging the glass layer between the first and second glass substrates or the step of forming the initial fracture in the first glass substrate may be performed earlier than the other.

Preferably, in the glass fusing method in accordance with the present invention, the glass layer is irradiated with the laser light through the second glass substrate from the second glass substrate side. In the heating stage in this case, a part on the second glass substrate side of the molten glass layer has the highest temperature. Therefore, the temperature change from the heating stage to the cooling stage becomes greater in the second glass substrate than in the first glass substrate. Hence, the deformation due to expansion/shrinkage is greater in extent in the second glass substrate than in the first glass substrate. That is, increasing the temperature change and its resulting extent of deformation on the second glass substrate side, which is required to be formed with the initial fracture, can reliably grow the fracture from the initial fracture acting as a start point, thereby making it possible to cleave the first and second glass substrates stably.

Preferably, in the glass fusing method in accordance with the present invention, the initial fracture is formed on the main face on the opposite side of the glass layer in the second glass substrate. In this case, the initial fracture can be formed in the second glass substrate after arranging the glass layer between the first and second glass substrates. This makes it unnecessary to handle the glass substrate in a state formed with the initial fracture and thus can improve the yield.

Preferably, in the glass fusing method in accordance with the present invention, the glass layer is irradiated with the laser light such that a peak value of a beam profile in a width direction of the glass layer substantially coincides with the initial fracture. In this case, in the width direction of the glass layer, the temperature change from the heating stage to the cooling stage becomes the largest at a position formed with the initial fracture, so that the fracture can grow more reliably from the initial fracture acting as a start point, whereby the first and second glass substrates can be cleaved more stably.

Preferably, when the region to be fused has a corner in the glass fusing method in accordance with the present invention, the glass layer has an intersection at the corner. This allows the fracture to reliably attain an intersection at the corner of the region to be fused, whereby the first and second glass substrates can be cut out securely along the region to be fused.

Advantageous Effects of Invention

The present invention can manufacture a highly reliable glass fusing structure.

BRIEF DESCRIPTION OF DRAWINGS

FIG. 8 is a set of sectional views illustrating other modes of an initial fracture;

FIG. 9 is a set of sectional views illustrating other modes of the initial fracture;

FIG. 10 is a set of sectional views illustrating other modes of the initial fracture;

DESCRIPTION OF EMBODIMENTS

Figure 1:
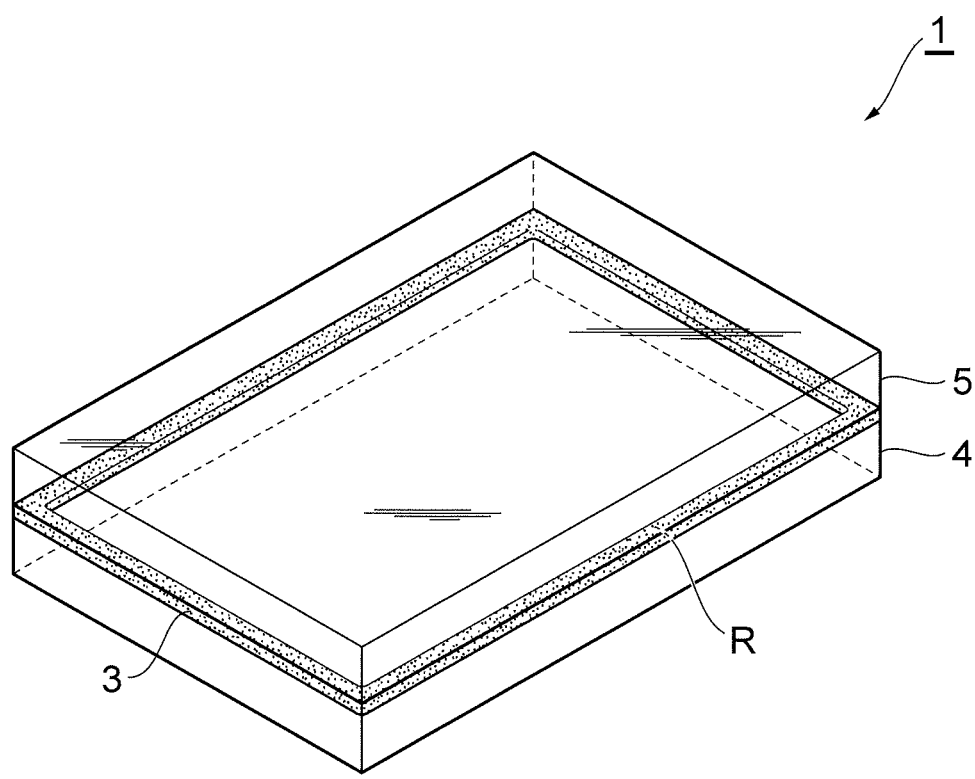
FIG. 1 is a perspective view of a glass fusing structure manufactured by an embodiment of the glass fusing method in accordance with the present invention.

In the following, preferred embodiments of the present invention will be explained in detail with reference to the drawings. In the drawings, the same or equivalent parts will be referred to with the same signs while omitting their overlapping descriptions.

As illustrated in FIG. 1, a glass fusing structure 1 is one in which glass members 4, 5 are fused to each other with a glass layer 3, which is formed along a region to be fused R, interposed therebetween. Each of the glass members 4, 5 is a rectangular sheet-shaped member having a thickness of 0.7 mm made of non-alkali glass, for example, while the region to be fused R is arranged like a rectangular ring with a predetermined width along the outer peripheries of the glass members 4, 5. The glass layer 3 is made of low-melting glass (vanadium-phosphate-based glass, lead-borate-based glass, or the like), for example, and formed into a rectangular ring with a predetermined width along the region to be fused R.

A glass fusing method for manufacturing the glass fusing structure 1 will now be explained.

Figure 2:
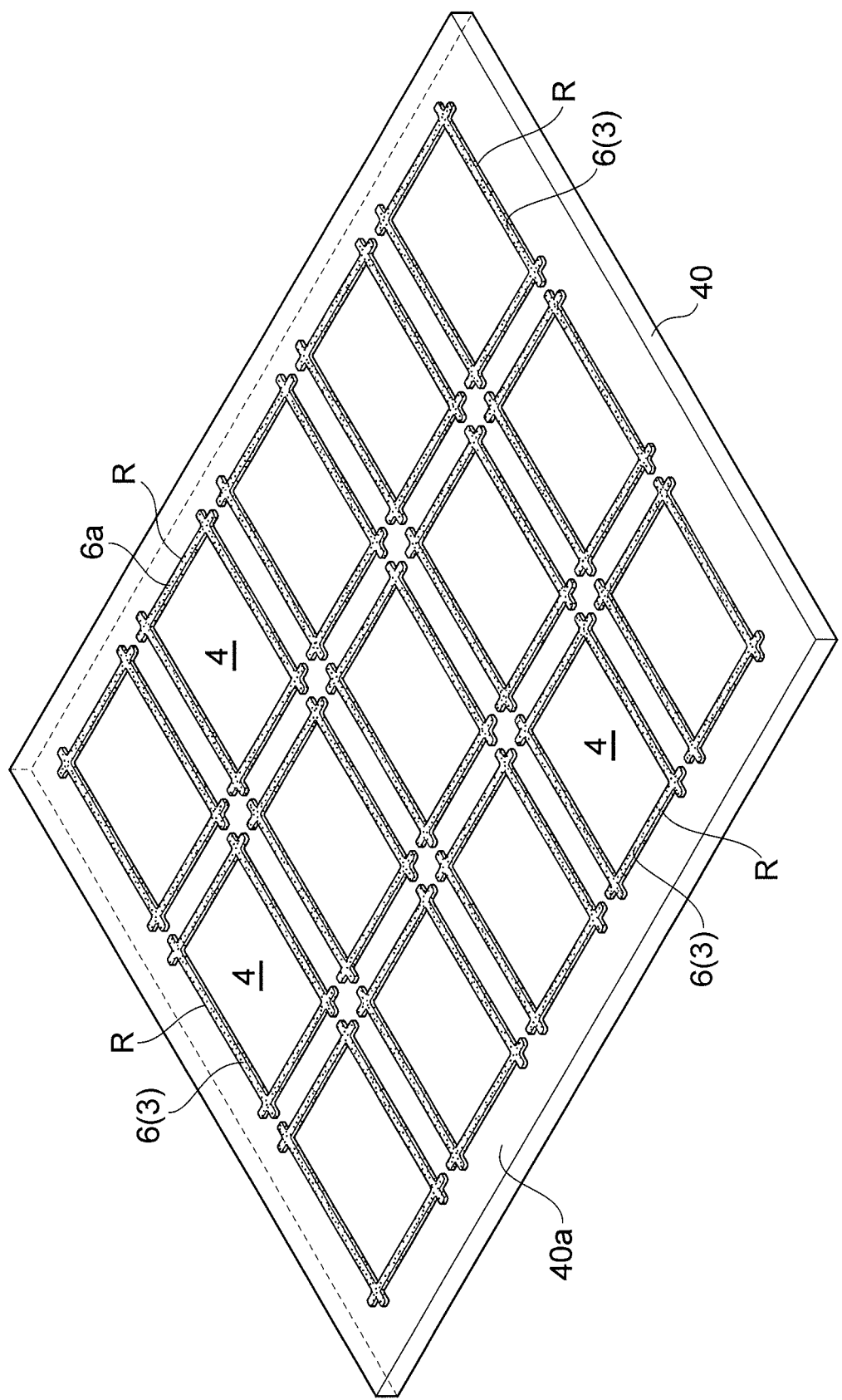
FIG. 2 is a perspective view for explaining the glass fusing method for manufacturing the glass fusing structure of FIG. 1.

First, as illustrated in FIG. 2, a frit paste is applied by a dispenser, screen printing, or the like to a main face 40a of a glass substrate (first glass substrate) 40 to become a matrix for the glass member 4, so as to form a paste layer 6 along each region to be fused R. An example of the fit paste is one in which a powdery glass fit (glass powder) 2 made of low-melting glass (vanadium-phosphate-based glass, lead-borate-based glass, or the like), a laser-light-absorbing pigment (laser-light-absorbing material) which is an inorganic pigment such as iron oxide, an organic solvent such as amyl acetate, and a binder which is a resin component (acrylic or the like) thermally decomposable at the melting point temperature of the glass or lower are kneaded.

The glass substrate 40 is a rectangular sheet-shaped substrate including a plurality of glass members 4 arranged two-dimensionally. For cutting out the glass members 4 from the glass substrate 40, the regions to be fused R each extending like a rectangular ring are set so as to be arranged two-dimensionally on the main face 40a of the glass substrate 40 correspondingly to the respective glass members 4. The paste layer 6 is formed such as to have an intersection (cross) at each corner of the regions to be fused R.

Subsequently, the paste layer 6 is dried, so as to remove the organic solvent, thereby securing the glass layers 3 to the main face 40a of the glass substrate 40. Then, the glass layers 3 are irradiated with laser light along the regions to be fused R, while locating a converging spot at the glass layers 3, so as to gasify the binder and remove it from the glass layers 3, while melting/re-solidifying the glass layers 3, thereby burning and fixing the glass layers 3 to the main face 40a of the glass substrate 40 (temporary firing). The temporary firing of the glass layers 3 may be performed by heating in a furnace instead of irradiation with the laser light.

Figure 3:
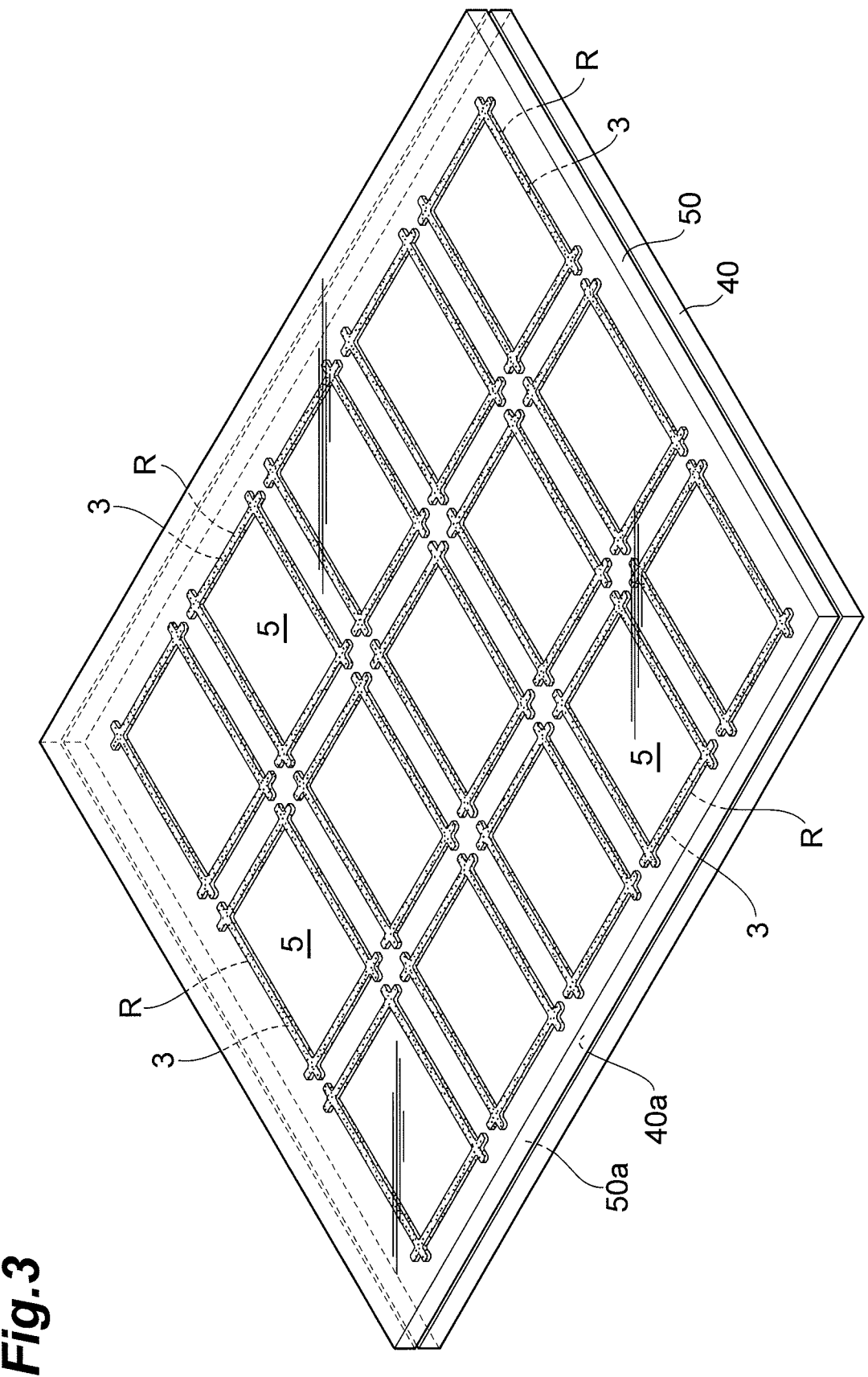
FIG. 3 is a perspective view for explaining the glass fusing method for manufacturing the glass fusing structure of FIG. 1.

Next, as illustrated in FIG. 3, a glass substrate (second glass substrate) 50 is superposed on the glass substrate 40 having the glass layers 3 fixed thereto with the glass layers 3 interposed therebetween. As with the glass substrate 40, the glass substrate 50 is a rectangular sheet-shaped substrate including a plurality of glass members 5 arranged two-dimensionally. As a consequence, the glass layers 3 containing the laser-light-absorbing pigment are arranged between the glass substrates 40, 50 with a predetermined width along the regions to be fused R each extending like a rectangular ring. The glass layers 3 have intersections at the corners of the regions to be fused R.

Figure 4:
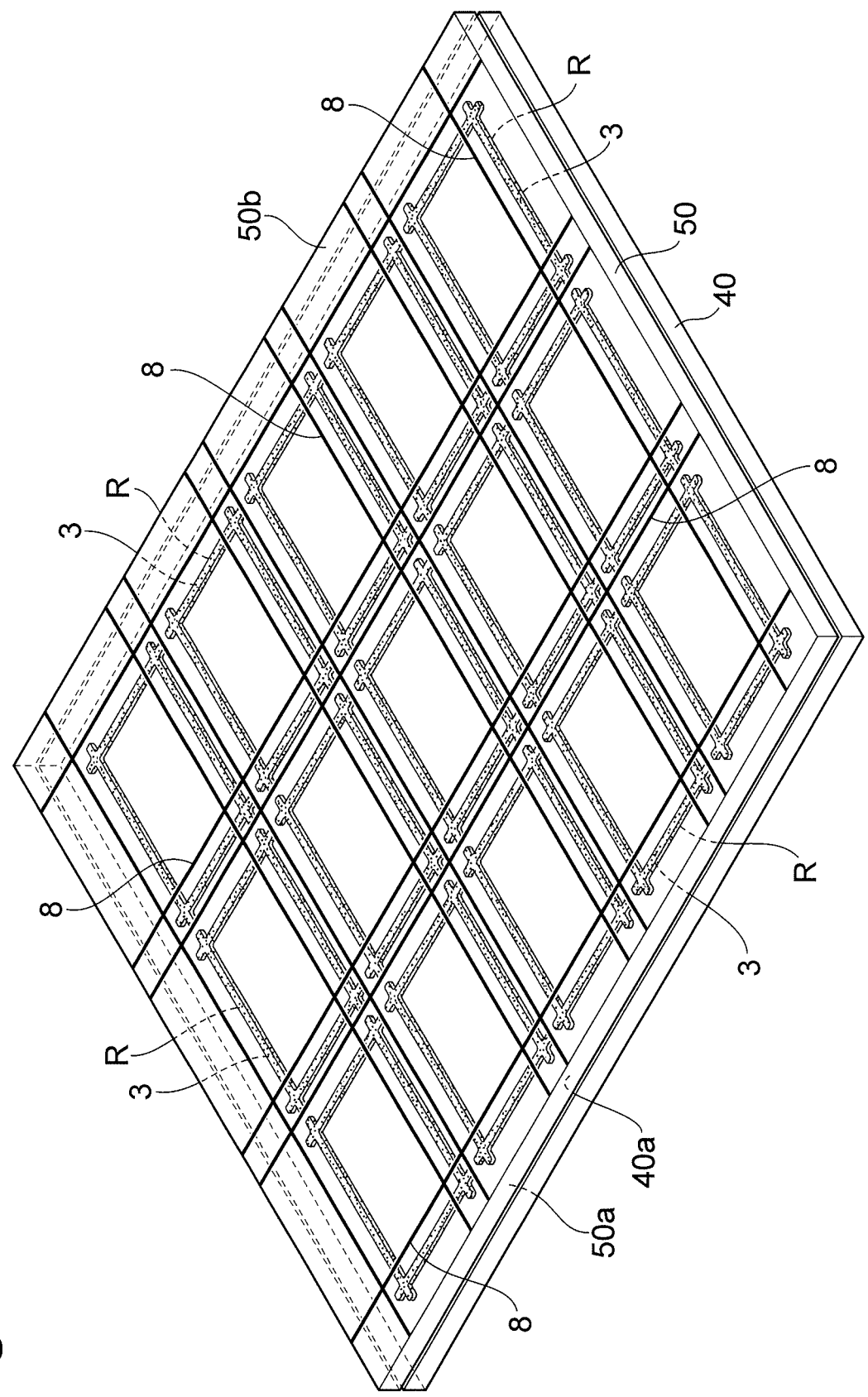
FIG. 4 is a perspective view for explaining the glass fusing method for manufacturing the glass fusing structure of FIG. 1.

Subsequently, as illustrated in FIG. 4, initial fractures 8 (which are scribe lines, i.e., grooves, here) are formed by a diamond scriber, a laser scriber, or the like on a main face 50b on the opposite side of the glass layers 3 in the glass substrate 50 (i.e., a main face opposing a main face 50a on the glass layer 3 side in the glass substrate 50). The initial fractures 8 are formed like grids on the main face 50b of the glass substrate 50 so as to overlap the glass layers 3 when seen in the thickness direction of the glass substrates 40, 50.

Figure 5:
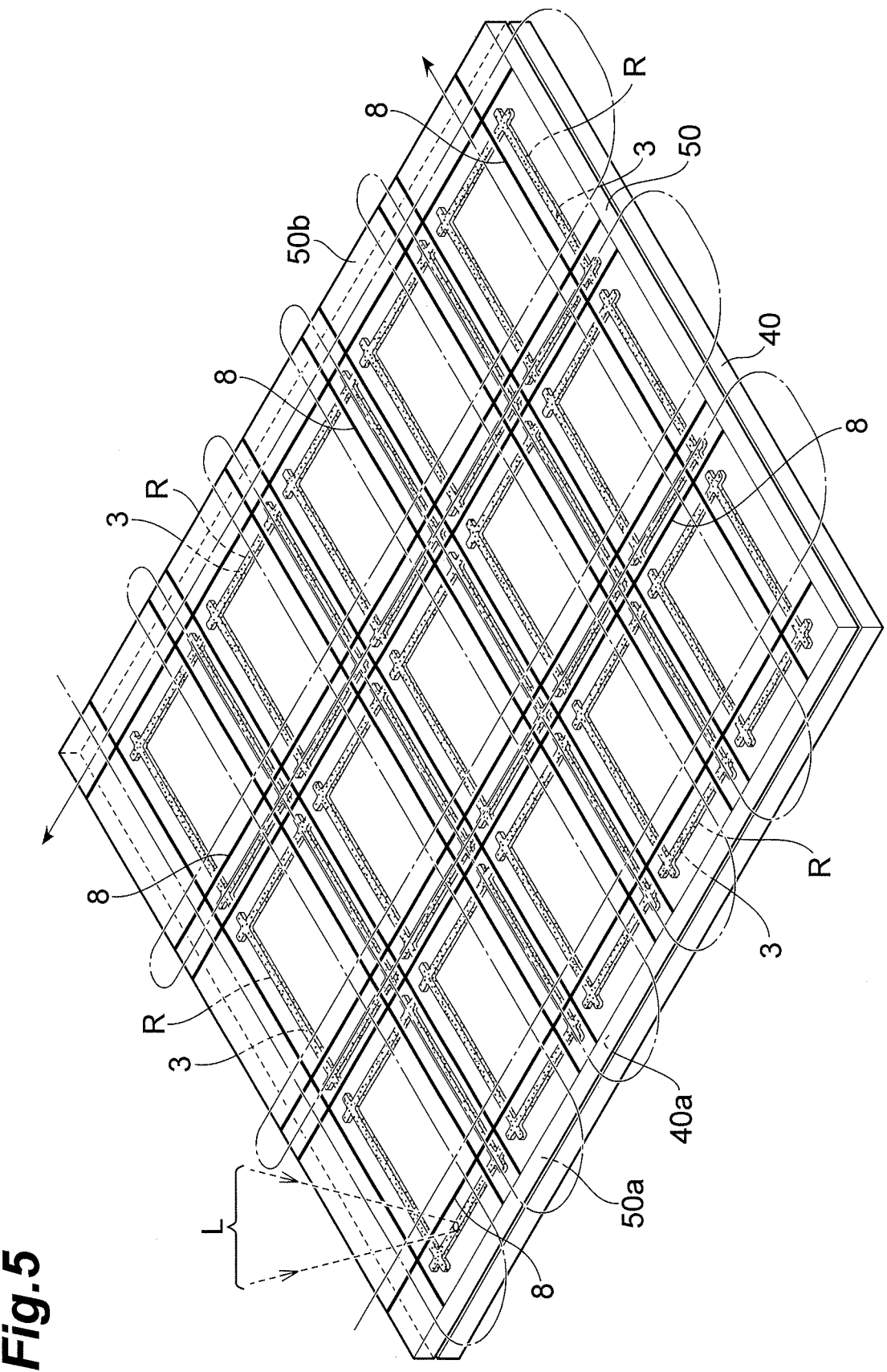
FIG. 5 is a perspective view for explaining the glass fusing method for manufacturing the glass fusing structure of FIG. 1.

Next, as illustrated in FIG. 5, the glass layers 3 are irradiated with laser light L such that the laser light L includes a part of the initial fractures 8, and an irradiation region of the laser light L is relatively moved along the regions to be fused R. Here, the glass layers 3 are irradiated with the laser light L through the glass substrate 50 from the glass substrate 50 side such that a peak value of the beam profile in the width direction of the glass layers 3 substantially coincides with the initial fractures 8. This subjects the glass layers 3 and glass substrates 40, 50 partly to heating and cooling stages in sequence, so as to bond the glass substrates 40, 50 to each other along the regions to be fused R (i.e., melt and re-solidify the glass layers 3 and their peripheral parts (parts of the main faces 40a, 50a of the glass substrates 40, 50) (final firing)) and cleave the glass substrates 40, 50 along the regions to be fused R, thereby yielding the glass fusing structure 1. Moving the irradiation region of the laser light L in a zigzag manner along the regions to be fused R set like grids as in the arrow of the dash-single-dot line of FIG. 5 can efficiently irradiate the glass layers 3 with the laser light L.

Figure 6:
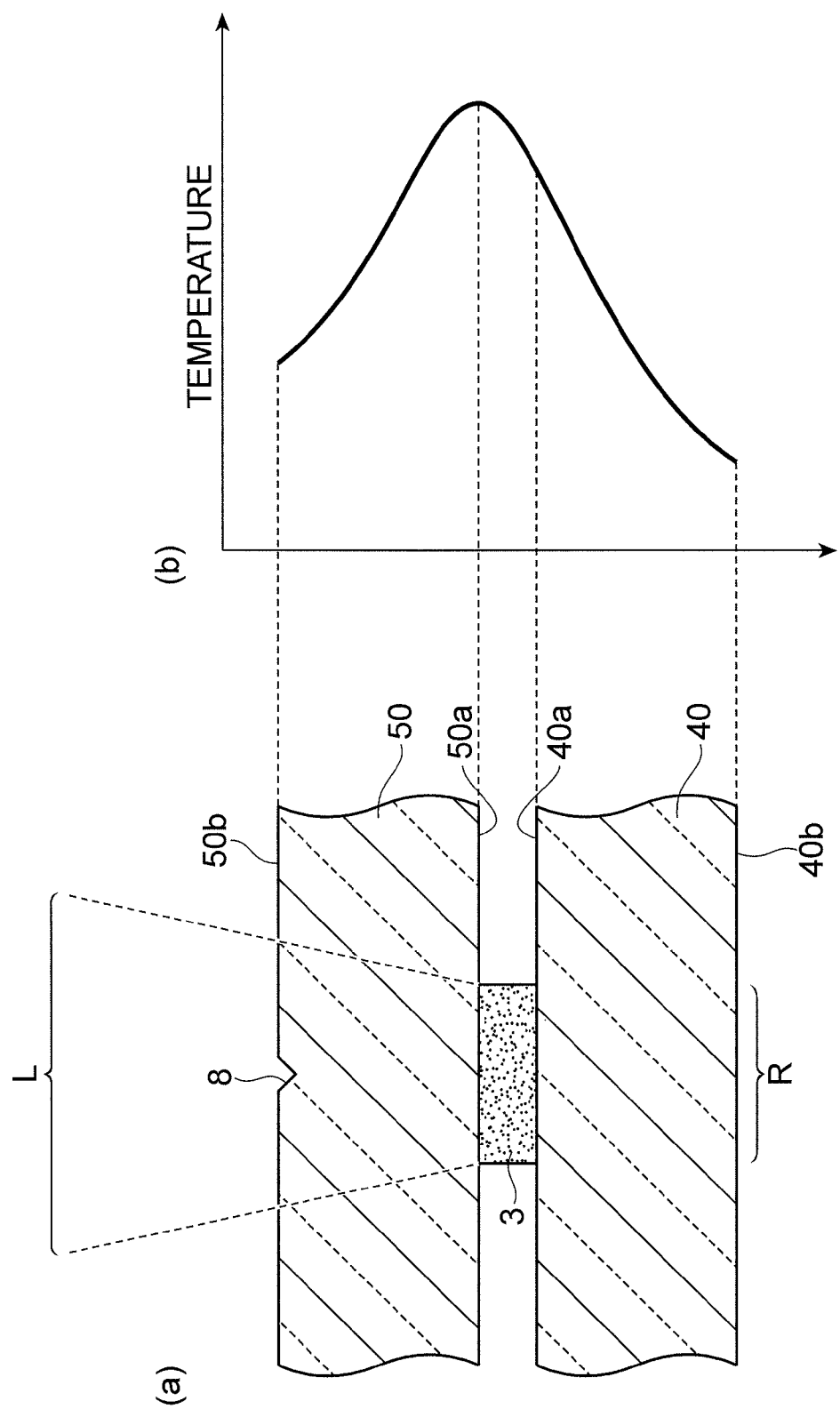
FIG. 6 is a diagram illustrating a temperature profile of a glass layer and glass substrates in a heating stage.

The heating and cooling stages will now be explained in more details. First, the heating stage is a stage where the glass layers 3 are irradiated with the laser light L through the glass substrate 50 from the glass substrate 50 side as illustrated in FIG. 6. In the heating stage the glass layers 3 is molten and a temperature difference is generated in a part along the region to be fused R in each of the glass substrates 40, 50 so that the main faces 40a, 50a on the glass layer 3 side have a temperature higher than that on the main faces 40b, 50b on the opposite side of the glass layers 3 in each of the glass substrates 40, 50. As a consequence, parts corresponding to the glass layers 3 in the glass substrates 40, 50 expand.

Figure 7:
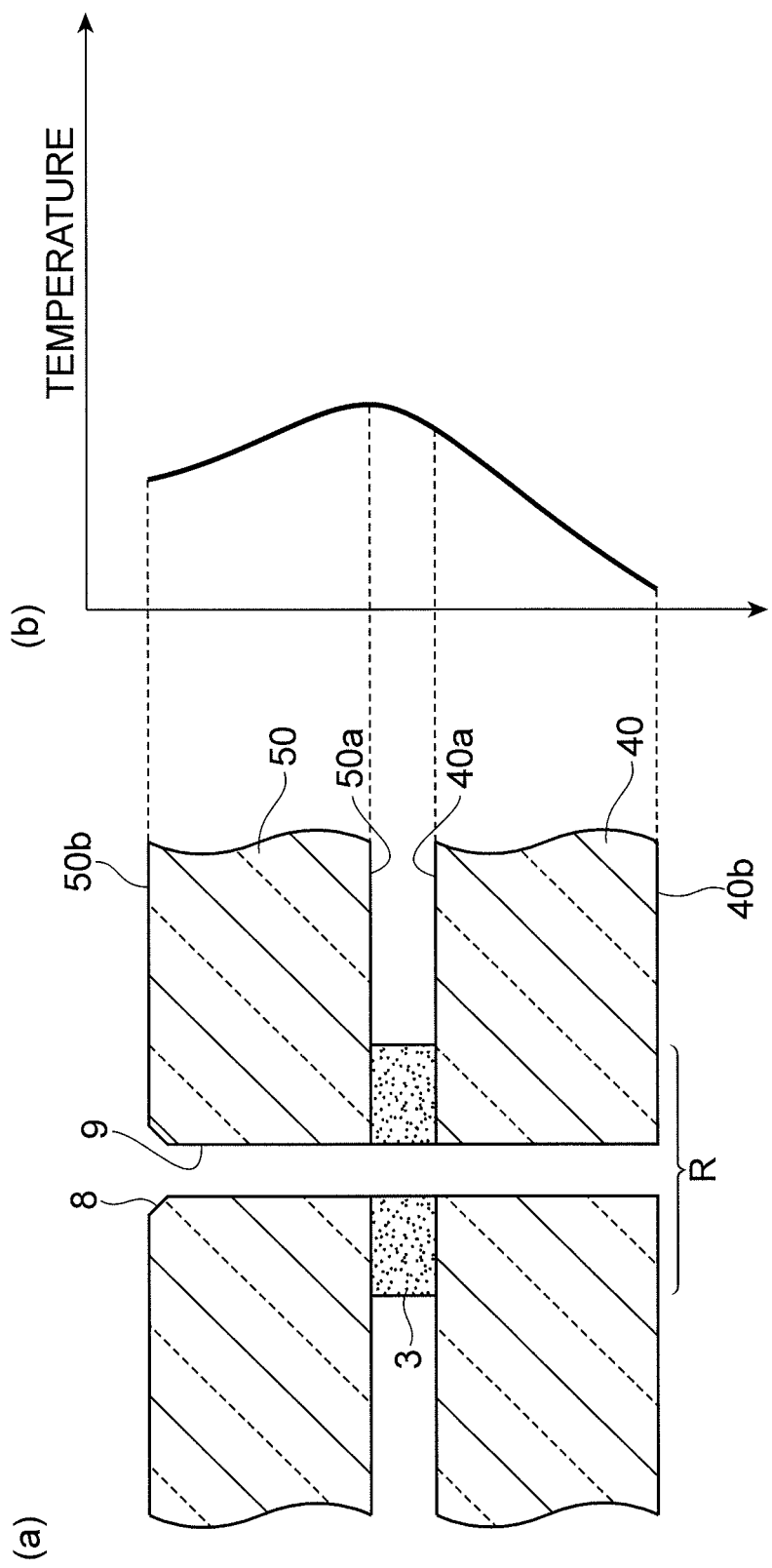
FIG. 7 is a diagram illustrating a temperature profile of the glass layer and glass substrates in a cooling stage.

Next, as illustrated in FIG. 7, the cooling stage is a stage immediately after the irradiation of the glass layers 3 with the laser light L, more specifically, a stage at which the irradiation of the glass layers 3 with the laser light L is terminated by relatively moving the irradiation region of the laser light L along the regions to be fused R. In the cooling stage, the molten glass layers 3 is solidified and by a stress occurring during cooling fractures 9 are grown in the thickness direction of the glass substrates 40, 50 through the glass layers 3 from the initial fractures 8 acting as a start point. That is, the parts corresponding to the glass layers 3 in the glass substrates 40, 50 shrink, so that tensile stresses occur in the glass substrates 40, 50 so as to open the initial fractures 8, thereby generating the fractures 9 from the initial fractures 8 acting as a start point, and the fractures 9 grow in the thickness direction of the glass substrates 40, 50 through the glass layers 3.

Since the glass layers 3 are irradiated with the laser light L through the glass substrate 50 from the glass substrate 50 side, the parts of the molten glass layers 3 on the glass substrate 50 side have the highest temperature in the heating stage as illustrated in FIG. 6. Therefore, as illustrated in FIGS. 6 and 7, the temperature change from the heating stage to the cooling stage is greater in the glass substrate 50 on the entrance side of the laser light L than in the glass substrate 40. Hence, the deformation due to expansion/shrinkage is greater in extent in the glass substrate 50 on the entrance side of the laser light L than in the glass substrate 40.

In the glass fusing method for manufacturing the glass fusing structure 1, as explained in the foregoing, in the heating stage, the glass layers 3 is molten by irradiation with the laser light L and a temperature difference is generated in a part along the region to be fused R in each of the glass substrates 40, 50 so that the main faces 40a, 50a on the glass layer 3 side have a temperature higher than that on the main faces 40b, 50b on the opposite side of the glass layers 3. The cooling stage solidifies the molten glass layers 3 and generates a stress in the glass substrates 40, 50 by cooling. Here, since the initial fractures 8 are formed in the glass layer 50 such as to overlap the glass layers 3 when seen in the thickness direction of the glass substrates 40, 50, the fractures 9 grow in the thickness direction of the glass layers 40, 50 though the glass layers 3 from the initial fractures 8 acting as a start point. As a consequence, contaminants remain less than in fusion-cutting by laser ablation, for example, so that the glass substrates 40, 50 can be fused together and cleaved along the regions to be fused R. Hence, this glass fusing method can manufacture the glass fusing structure 1 with high reliability.

The glass layers 3 are irradiated with the laser light L through the glass substrate 50 formed with the initial fractures 8 from the glass substrate 50 side. As a consequence, in the heating stage, parts on the glass substrate 50 side of the molten glass layers 3 have the highest temperature. Therefore, the temperature change from the heating stage to the cooling stage becomes greater in the glass substrate 50 than in the glass substrate 40. Hence, the deformation due to expansion/shrinkage is greater in extent in the glass substrate 50 on the entrance side of the laser light L than in the glass substrate 40. That is, increasing the temperature change and its resulting extent of deformation on the side of the glass substrate 50 formed with the initial fractures 8 can reliably grow the fractures 9 from the initial fractures 8 acting as a start point, thereby making it possible to cleave the glass substrates 40, 50 stably.

The initial fractures 8 are formed on the main face 50b on the opposite side of the glass layers 3 in the glass substrate 50. In this case, the initial fractures 8 can be formed in the glass substrate 50 after stacking the glass substrates 40, 50 with the glass layers 3 interposed therebetween. This makes it unnecessary to handle the glass substrate 50 in a state formed with the initial fractures 8 and thus can improve the yield.

The glass layers 3 are irradiated with the laser light L such that a peak value of the beam profile in the width direction of the glass layers 3 substantially coincides with the initial fractures 8. As a consequence, in the width direction of the glass layers 3, the temperature change from the heating stage to the cooling stage becomes the largest at positions formed with the initial fractures 8, so that the fractures 9 can grow more reliably from the initial fractures 8 acting as a start point, whereby the glass substrates 40, 50 can be cleaved more stably.

Since the glass layers 3 have an intersection at each corner of the regions to be fused R, the fractures 9 can reliably attain an intersection at the corner, whereby the glass substrates 40, 50 can be cut out securely along the regions to be fused R. This is effective in particular when taking out a number of glass members 4, 5 from the glass substrates 40, 50.

The present invention is not limited to the above-mentioned embodiment. For example, at least one of the glass substrates 40, 50 may be formed with the initial fractures 8 before stacking the glass substrates 40, 50 with the glass layers 3 interposed therebetween.

The initial fractures 8 are not limited to scribe lines and the like which overlap all the parts where the glass layers 3 extend, but may be dot-like cutouts and the like overlapping a part of the glass layers 3. Irradiating the glass layers 3 with the laser light L so that such initial fractures 8 are included in the laser light L while relatively moving the irradiation region of the laser light L along the regions to be fused R allows the fractures 9 generated from the initial fractures 8 acting as a start point to grow along the regions to be fused R in this case as well.

As illustrated in FIG. 8(a), the initial fractures 8 may be formed on the main face 50a on the glass layer 3 side of the glass substrate 50 on the entrance side of the laser light L. In the heating stage in this case, parts on the glass substrate 50 side of the molten glass layers 3 have the highest temperature, whereby the initial fractures 8 are formed at positions where the temperature change from the heating stage to the cooling stage is the largest. Therefore, the fractures 9 can grow more reliably from the initial fractures 8 acting as a start point. The initial fractures 8 may be formed on the main face 40a on the glass layer 3 side of the opposite glass substrate 40 as illustrated in FIG. 8(b) or on the main face 40b of the glass substrate 40 opposite from the glass layers 3 as illustrated in FIG. 8(c).

As illustrated in FIGS. 9 and 10, the initial fractures 8 may be formed in both of the glass substrates 40, 50. Forming the initial fractures 8 in both of the glass substrates 40, 50 can reliably prevent cleavage surfaces of the glass substrates 40, 50 from meandering, thereby making it possible to yield highly accurate cleavage surfaces along the thickness direction of the glass substrates 40, 50.

Figure 11:
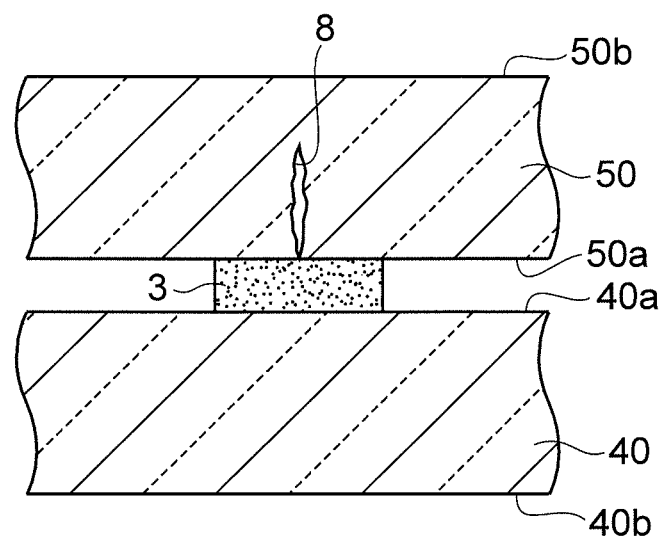
FIG. 11 is a sectional view illustrating another mode of the initial fracture.

As illustrated in FIG. 11, the initial fractures 8 may be modified regions such as cracks formed within at least one of the glass substrates 40, 50. Such a modified region to become a cutting start point is formed by irradiating at least one of the glass substrates 40, 50 with laser light while locating a converging point therewithin, so as to generate multiphoton absorption or the like at the position of the converging point. In such a case, the initial fractures 8 can be formed at desirable positions such as positions where the temperature change from the heating stage to the cooling stage is the largest, even after stacking the glass substrates 40, 50 with the glass layers 3 interposed therebetween. Even when the initial fractures 8 are formed before stacking the glass substrates 40, 50 with the glass layers 3 interposed therebetween, the strength of the glass substrates 40, 50 is maintained since the initial fractures 8 are formed therewithin, whereby the handling of the glass substrates 40, 50 becomes easier.

Figure 12:
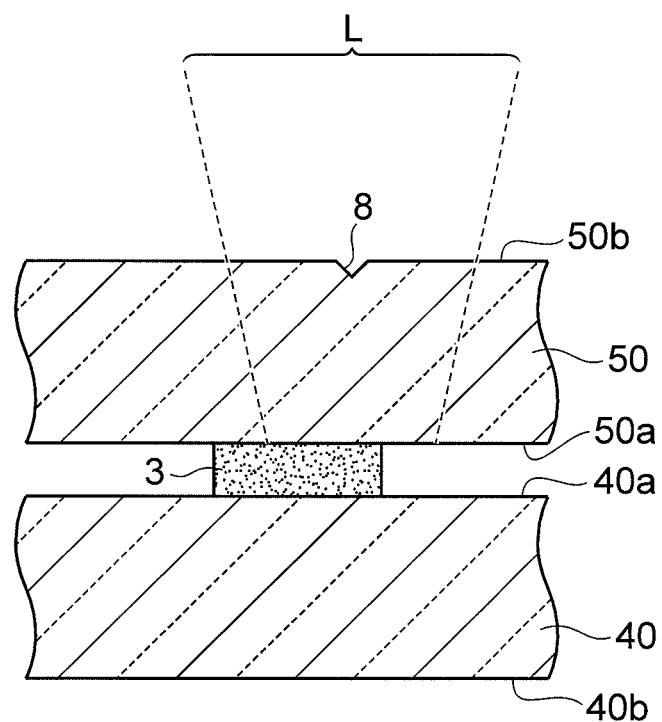
FIG. 12 is a sectional view illustrating the positional relationship between the initial fracture and laser light.

As illustrated in FIG. 12, the initial fractures 8 may be formed at positions shifted from the centers of the glass layers 3 in the width direction thereof. Even in this case, irradiating the glass layers 3 with the laser light L such that a peak value of the beam profile in the width direction of the glass layers 3 substantially coincides with the initial fractures 8 can more reliably grow the fractures 9 from the initial fractures 8 acting as a start point, thereby making it possible to cleave the glass substrates 40, 50 more stably. This is because the temperature change from the heating stage to the cooling stage becomes the largest at positions formed with the initial fractures 8. For securing larger fusing margins for the glass layers 3 in the glass fusing structure 1, the positions where the initial fractures 8 are formed may be shifted to the side opposite from the side to become the glass fusing structure 1.

As the glass layers 3 to be irradiated with the laser light L, film-like (layered) members containing a laser-light-absorbing pigment may be used. When temporary firing is performed by irradiation with laser light, glass materials such as the glass frit 2 constituting the glass layers 3 may have a melting point on a par with or higher than that of the glass substrates 40, 50 instead of the one lower than that. The laser-light-absorbing pigment may be contained in glass materials, such as the glass frit 2, themselves.

INDUSTRIAL APPLICABILITY

The present invention can manufacture a highly reliable glass fusing structure.

REFERENCE SIGNS LIST

1 . . . glass fusing structure; 3 . . . glass layer; 40 . . . glass substrate (first glass substrate); 50 . . . glass substrate (second glass substrate); R . . . region to be fused; L . . . laser light

The invention claimed is:

1. A glass fusing method for manufacturing a glass fusing structure by fusing first and second glass substrates to each other, the method comprising the steps of:
    arranging a glass layer containing a laser-light-absorbing material between the first and second glass substrates with a predetermined width along an extending region to be fused;
    forming an initial fracture in at least the second glass substrate in the first and second glass substrates such that the initial fracture overlaps the glass layer when seen in a thickness direction of the first and second glass substrates; and
    irradiating the glass layer with laser light such that at least a part of the initial fracture is included in the laser light while relatively moving an irradiation region of the laser light along the region to be fused, so as to pass the glass layer and the first and second glass substrates through a heating stage and a cooling stage by the irradiation of the glass layer with laser light, thereby fusing and cleaving the first and second glass substrates along the region to be fused;
    wherein in the heating stage the glass layer is molten and a temperature difference is generated in a part along the region to be fused in each of the first and second glass substrates so that a main face on the glass layer side has a temperature higher than that on a main face on the opposite side of the glass layer in each of the first and second glass substrates; and
    wherein in the cooling stage the molten glass layer is solidified and by a stress occurring during cooling a fracture is grown in a thickness direction of the first and second glass substrates through the glass layer from the initial fracture acting as a start point, and
    wherein in the cooling stage, the fracture grows beyond a border between the first and second glass substrates and the glass layer.

2. A glass fusing method according to claim 1, wherein the glass layer is irradiated with the laser light through the second glass substrate from the second glass substrate side.

3. A glass fusing method according to claim 1, wherein the initial fracture is formed on the main face on the opposite side of the glass layer in the second glass substrate.

4. A glass fusing method according to claim 1, wherein the glass layer is irradiated with the laser light such that a peak value of a beam profile in a width direction of the glass layer substantially coincides with the initial fracture.

5. A glass fusing method according to claim 1, wherein when the region to be fused has a corner, the glass layer has an intersection at the corner.

* * * * *